United States Patent [19]
Gleasman et al.

[11] Patent Number: 6,135,220
[45] Date of Patent: Oct. 24, 2000

[54] MODULAR SYSTEM FOR TRACK-LAYING VEHICLE

[75] Inventors: Vernon E. Gleasman, Pittsford; Keith E. Gleasman, Fairport, both of N.Y.

[73] Assignee: Torvec Inc., Pittsford, N.Y.

[21] Appl. No.: 09/213,650

[22] Filed: Dec. 16, 1998

[51] Int. Cl.$^7$ .................................................. B62D 55/00
[52] U.S. Cl. ..................... 180/9.1; 180/9.21; 180/9.26; 180/9.44
[58] Field of Search .................. 180/9, 9.1, 9.21, 180/9.26, 9.3, 9.44, 9.5, 9.54, 9.38; 280/28.5, 124.128

[56] References Cited

U.S. PATENT DOCUMENTS

| | | |
|---|---|---|
| 1,861,866 | 6/1932 | Knox et al. . |
| 1,975,794 | 10/1934 | Knox et al. ............................. 180/9.1 |
| 2,131,083 | 9/1938 | Winn . |
| 2,342,110 | 2/1944 | Barber . |
| 2,859,641 | 11/1958 | Gleasman . |
| 2,869,889 | 1/1959 | Dickison . |
| 3,443,654 | 5/1969 | Schoonover ........................... 180/9.44 |
| 3,473,797 | 10/1969 | Selzer . |
| 3,572,745 | 3/1971 | Willetts . |
| 3,603,423 | 9/1971 | Schoonover . |
| 3,653,455 | 4/1972 | Hetteen . |
| 3,746,361 | 7/1973 | McGee . |
| 3,776,326 | 12/1973 | Davin et al. ............................. 180/9.1 |
| 3,923,112 | 12/1975 | Goodgame . |
| 3,938,605 | 2/1976 | Koch ....................................... 180/9.5 |
| 3,977,700 | 8/1976 | Leaf . |
| 3,994,352 | 11/1976 | Siorek ..................................... 180/9.1 |
| 4,199,166 | 4/1980 | Bohmer . |
| 4,459,932 | 7/1984 | Hildebrand ............................ 180/9.26 |
| 4,732,053 | 3/1988 | Gleasman et al. . |
| 4,776,235 | 10/1988 | Gleasman et al. . |
| 4,776,236 | 10/1988 | Gleasman et al. . |
| 4,893,883 | 1/1990 | Satzler ..................................... 180/9.1 |
| 4,895,052 | 1/1990 | Gleasman et al. . |
| 5,361,860 | 11/1994 | Smith et al. ............................. 180/9.1 |
| 5,531,282 | 7/1996 | Jennen ..................................... 180/9.1 |
| 5,575,347 | 11/1996 | Uchibaba et al. ....................... 180/9.1 |

FOREIGN PATENT DOCUMENTS

| | | | |
|---|---|---|---|
| 35725 | 3/1954 | Poland .................................... | 180/9.1 |

*Primary Examiner*—Daniel G. DePumpo
*Attorney, Agent, or Firm*—Eugene Stephens & Associates

[57] ABSTRACT

A modular track suspension system is readily adapted for attachment to any presently manufactured full-size automotive vehicle built with a load-carrying frame, being easily substituted for the vehicle's conventional wheeled undercarriage either during or following final assembly. The module uses a pair of endless rubber tracks, one track under each respective side of the vehicle; and each track is frictionally driven by tandem pairs of dual-wheels with rubber tires, each tandem pair of wheels being driven, respectively, by an intermediately positioned drive-unit axle. The dual-wheels are each movable in a vertical plane, and each dual-wheel can move separately and independently of the similar independent movement of the other dual-wheel with which it is tandemly paired. Each dual-wheel is also resiliently biased in the direction of the terrain on which the vehicle is standing or moving. Driving torque is delivered to the two endless tracks through a plurality of differentials appropriately and simply connected directly with the vehicle's drive shaft. In all preferred embodiments, an additional differential that is connected with, and is responsive to, the operation of the vehicle's steering wheel superimposes additive and subtractive steering torques to the already differentiated driving torques being delivered to the left-side and right-side tracks for controlling the vehicle's direction.

13 Claims, 9 Drawing Sheets

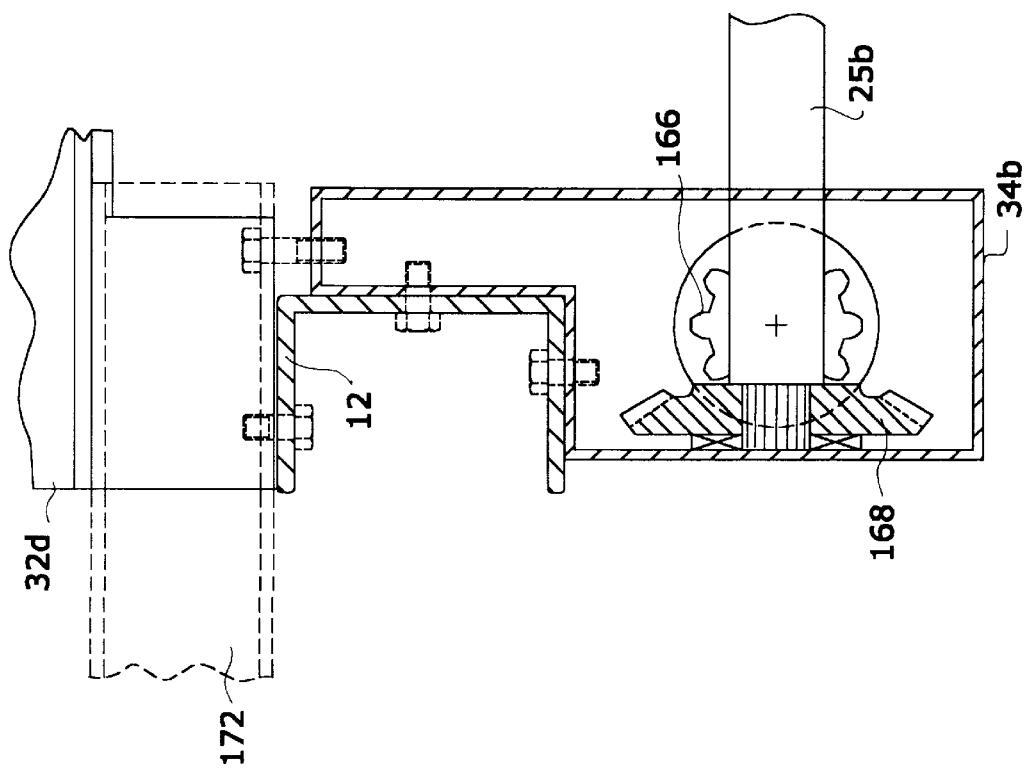
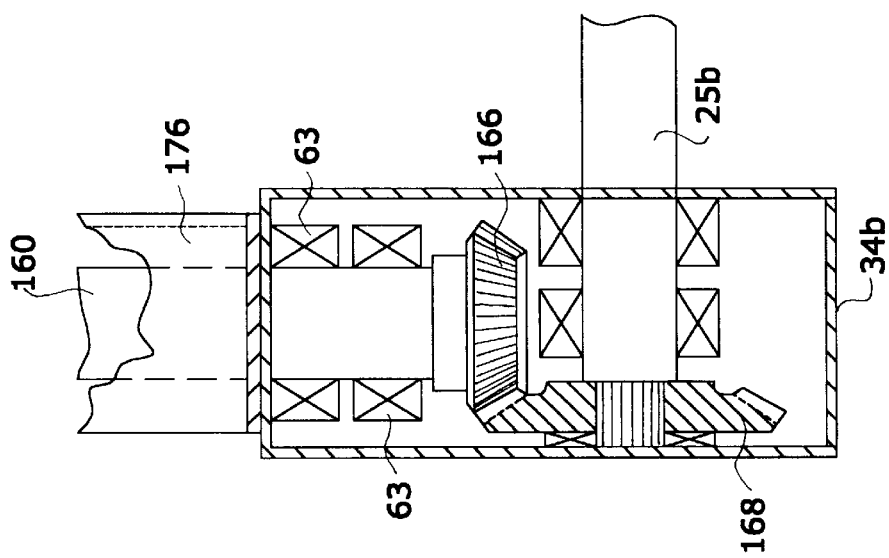
FIG. 8B
FIG. 8A

MODULAR SYSTEM FOR TRACK-LAYING VEHICLE

TECHNICAL FIELD

This invention relates to track-laying vehicles (i.e., vehicles which use endless tracks rather than tires to contact the terrain over which they are driven, e.g., tractors, tanks, bulldozers, etc.) and, more particularly, to a modular system for supporting the mechanisms used to drive and suspend the endless tracks in a format allowing the track module to be easily attached to the frame of a pre-existing automotive cabin/engine/load-carrying unit.

BACKGROUND

While the invention is directed to the conversion of conventional wheeled vehicles into track-laying vehicles, its particular purpose is to convert such conventional vehicles into track-laying all-terrain vehicles specifically designed for normal speed travel over paved highways as well as appropriate use over unpaved roads and uneven off-road terrain.

Presently, there is an acute need for a form of vehicle appropriate for both highway and off-road use over snow-covered, very uneven, or muddy terrain. The need for such a vehicle is great following natural emergencies (snow and wind storms, floods, etc.) and is at present particularly needed in developing countries. Unfortunately, almost all available automotive vehicles require infrastructure (paved highways, bridges, etc.) for practical operation, and the developing countries are decades away from having the necessary infrastructure for such conventional vehicles. Further, the only load-carrying off-road vehicles presently in use have either very large wheels or very cumbersome tracks which are heavy, slow moving, and inappropriate for highway use. While smaller all-terrain wheeled vehicles are commercially available, these do not carry adequate loads for normal multi-passenger or produce transport, and their drive wheels can easily become mired in heavy mud or snow. While smaller tracked all-terrain vehicles have been proposed (see U.S. Pat. No. 3,653,455 issued to A. E. Hetteen), these are not readily steerable and lack practicality.

Finally, there are some small track "modules" that are commercially available for separate attachment to each of the axles of existing vehicles (each small track module replacing, respectively, one of the vehicle's wheels); but these are cumbersome, relatively difficult to attach to the vehicle and, apparently, are neither readily steerable nor appropriate for conventional highway-speed operation.

Our earlier invention (U.S. Pat. No. 4,776,235 to V. E. Gleasman et al.) makes it possible to steer track-laying vehicles with a single steering wheel in the same manner as other highway vehicles are steered. However, we are still unaware of any commercially available tracked vehicles that are designed for both off-road and use over pavement at normal highway speeds and capable of transporting significant loads at conventional highway speeds. Further, the costs for developing, designing, and manufacturing such a completely new track-laying vehicle would be extremely large, even for the already existing mega-corporations of the world's auto industry.

This invention addresses these problems and provides a possible solution to the major transportation problems of the world's developing countries in Asia, Africa, and South/Central America.

SUMMARY OF THE INVENTION

Our invention is a modular track suspension system. The term "modular" is used in its conventional sense, namely, to indicate a substantially self-contained unit that supplies a major function necessary to vehicular operation The inventive track system can be readily adapted to any automotive vehicle built with a load-carrying frame, including station wagons, sports utility vehicles, and most models of 4-, 6-, and 10-wheel trucks presently being manufactured by the world's major automotive companies. These existing and commercially available vehicles all include fully equipped passenger cabins with steering wheels, engines, and transmissions, all carried by steel beam frames. For truck models, the steel beam frames can be used to mount various types of truck bodies (e.g., flat beds, low or high sides, panel, covered, or uncovered, etc.), and respective 4-, 6-, or 10-wheel undercarriages are suspended beneath the frames. With minor changes to the dimensions and bolt holes of the invention's housings and structural support members, the novel tracked module disclosed herein can be easily substituted for a vehicle's conventional wheeled undercarriage during or following final assembly.

[NOTE: As used herein, the terms "module" and "modular" are not intended to indicate that the invention must always be built as a totally separate structure for use with existing vehicles. That is, while "modularity" is an extremely important and valuable feature, this invention can, of course, also be incorporated as an integral part of a special vehicle originally designed to use a track suspension system.]

In its preferred embodiments, the invention utilizes a pair of endless tracks made from an elastic and primarily non-metallic material, preferably rubber or an elastomer. One track is positioned under each respective side of the vehicle, and each track is frictionally driven by one or two drive units. Each drive unit has a tandem pair of wheels; and, preferably, each wheel is a "dual-wheel", i.e., two side-by-side wheels on a shared axle. Each wheel is covered by a tire, and each tire is in frictional driving contact with its respective track. Also, each drive unit has a respective drive-unit axle positioned intermediate the dual-wheels of each tandem pair.

The tandem dual-wheels of each drive unit are driven, respectively, by the intermediately positioned drive-unit axle; and the dual-wheels are mounted so that each is movable in a perpendicular vertical plane and so that each dual-wheel can move separately and independently of the similarly independent movement of the other dual-wheei with which it is tandemly paired. Each dual-wheel is also resiliently biased in the direction of the terrain on which the vehicle is standing or moving.

Preferably, each respective track is moved by two drive units simultaneously, a driven tandem dual-wheel of one drive unit being in contact with the rear of the track and a driven tandem dual-wheel of the second drive unit being in contact with the front of the track. Each track is also in frictional contact with the tires of an undriven "idler" dual-wheel that is positioned between the tandem dual-wheels of the two drive units.

A "central drive assembly", which is appropriately and simply connected directly with the vehicle's drive shaft, divides the torque differentially between the two respective tracks; and, in preferred embodiments, each respective track is provided with its own side differential which divides the torque differentially between the front and rear drive units associated with each track to prevent wind-up in these dual drives. These side differentials are preferably "limited slip" to assure that more driving torque is delivered to the portion of the endless track experiencing the greater traction.

In all preferred embodiments, the module's drive arrangements also control the vehicle's direction by means of a "steering assembly" using an additional differential that is connected with, and is responsive to, the operation of the vehicle's steering wheel. This additional differential, which is referred to hereinafter as a "steering differential", superimposes additive and subtractive steering torques to the already differentiated driving torques being delivered to the left-side and right-side tracks.

As just indicated above, our track-laying module is designed (a) to replace the conventionally wheeled undercarriage of most existing vehicles during the assembly of the vehicle, or (b) to be substituted for the existing conventionally wheeled undercarriage of already assembled vehicles.

Our track-laying suspension system permits the vehicle to be driven at conventional speeds over paved highways while permitting relatively heavy loads to be carried over unpaved surfaces that are uneven, or so very muddy, or so very snow-covered as to be practically impossible to traverse with a conventional truck and even difficult for travel on foot. For example, an average-size human when walking (and not carrying a load) usually exerts more than 338 grams/cm$^2$ (5 pounds/in$^2$) with each step upon a muddy or snow-covered surface. When our track module is suspended from a loaded truck weighing 2,250 kilograms (5,000 pounds), the tracks exert about only 173 grams/cm$^2$ (2.5 pounds/in$^2$), permitting the loaded truck to ride on top of the same muddy or snow-covered surface into which the human might sink ankle- or knee-deep. Similarly our track-laying system would permit the loaded truck to be moved over most surfaces, e.g., landscaped grass, without causing as much damage as a person walking over it.

We believe that our modular track-laying suspension system will make it possible for special users (e.g., farmers, campers, utility companies) to use the same working vehicle for both conventional travel over paved highways and off-road. However, as indicated earlier, we also believe that vehicles equipped with our track-laying suspension system will have particular utility in the developing countries of Asia, Africa, and South/Central America.

DRAWINGS

FIGS. 1, 2, and 3 are, respectively, schematic partially cross-sectional side, rear, and top views (with some parts and crosshatching omitted to enhance clarity) of selected portions of the modular track-laying suspension system of the invention as applied to an existing truck (shown in phantom lines), FIG. 1 being a view generally along the plane 1-1 in FIG. 2, while FIG. 2 is a view along the plane 2-2 in FIG. 1.

Figure 6:
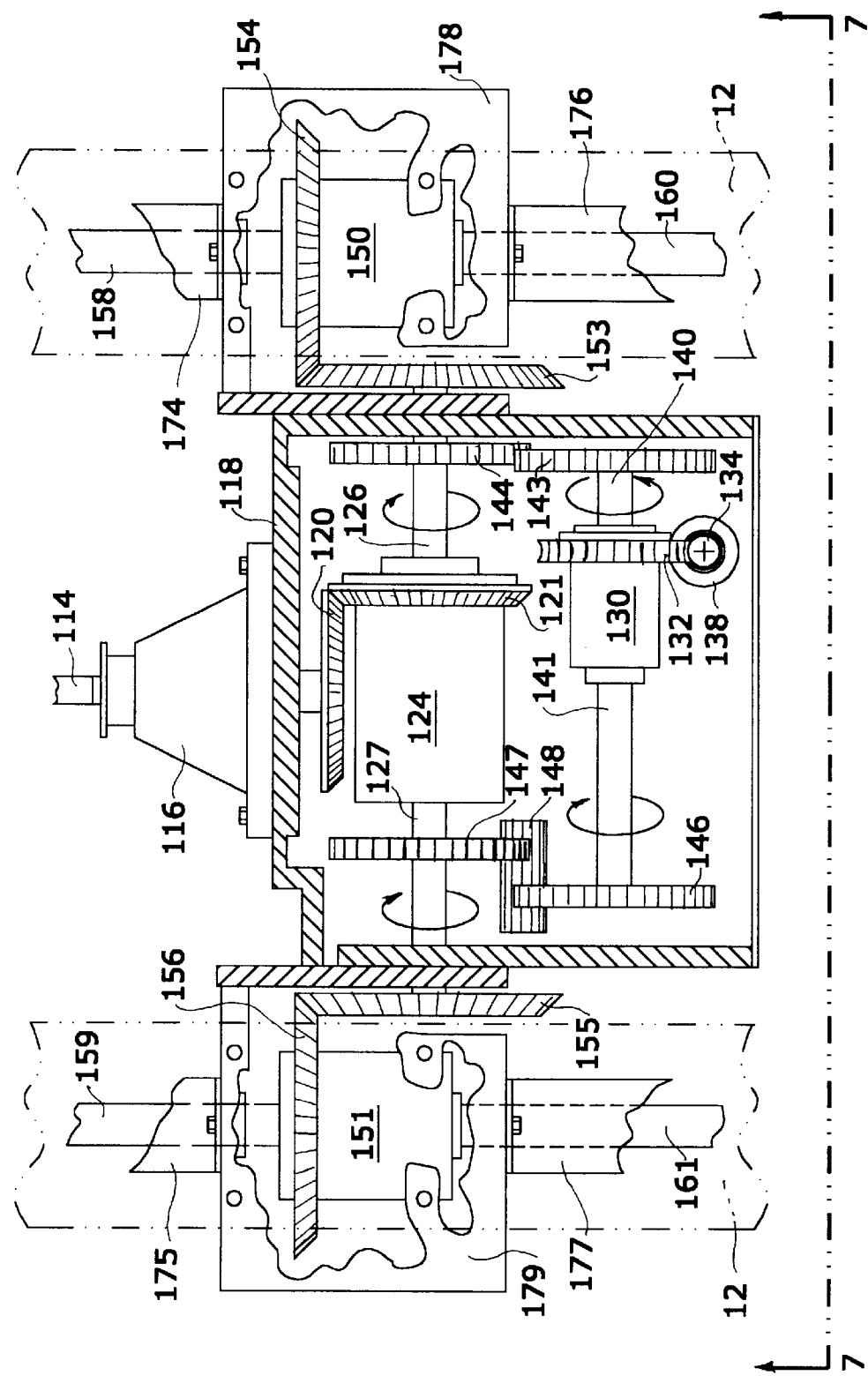
Figure 7:
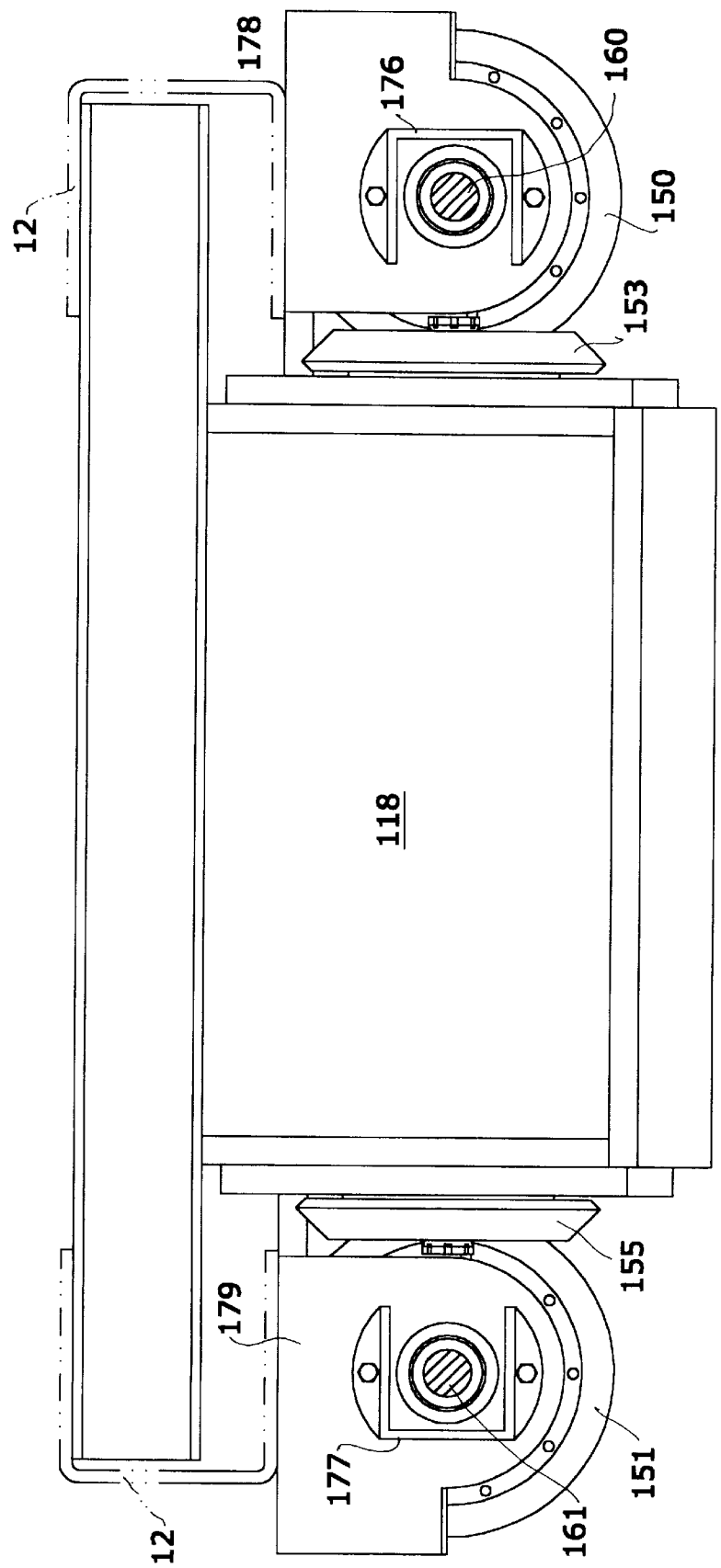

FIGS. 6 and 7 are, respectively, schematic partially cross-sectional top and rear views (with some parts and cross-hatching omitted to enhance clarity) of selected portions of the central housing that encloses and supports a central differential and a steering differential and also supports additional left-side and right-side differentials, FIG. 7 being a view generally along the plane 7-7 in FIG. 6.

FIGS. 8A and 8B are, respectively, schematic partially cross-sectional top and rear views (with some parts and cross-hatching omitted to enhance clarity) of selected portions of the right-angle drives used to redirect the torque from the side differentials to the drive-unit axles.

Figure 9:
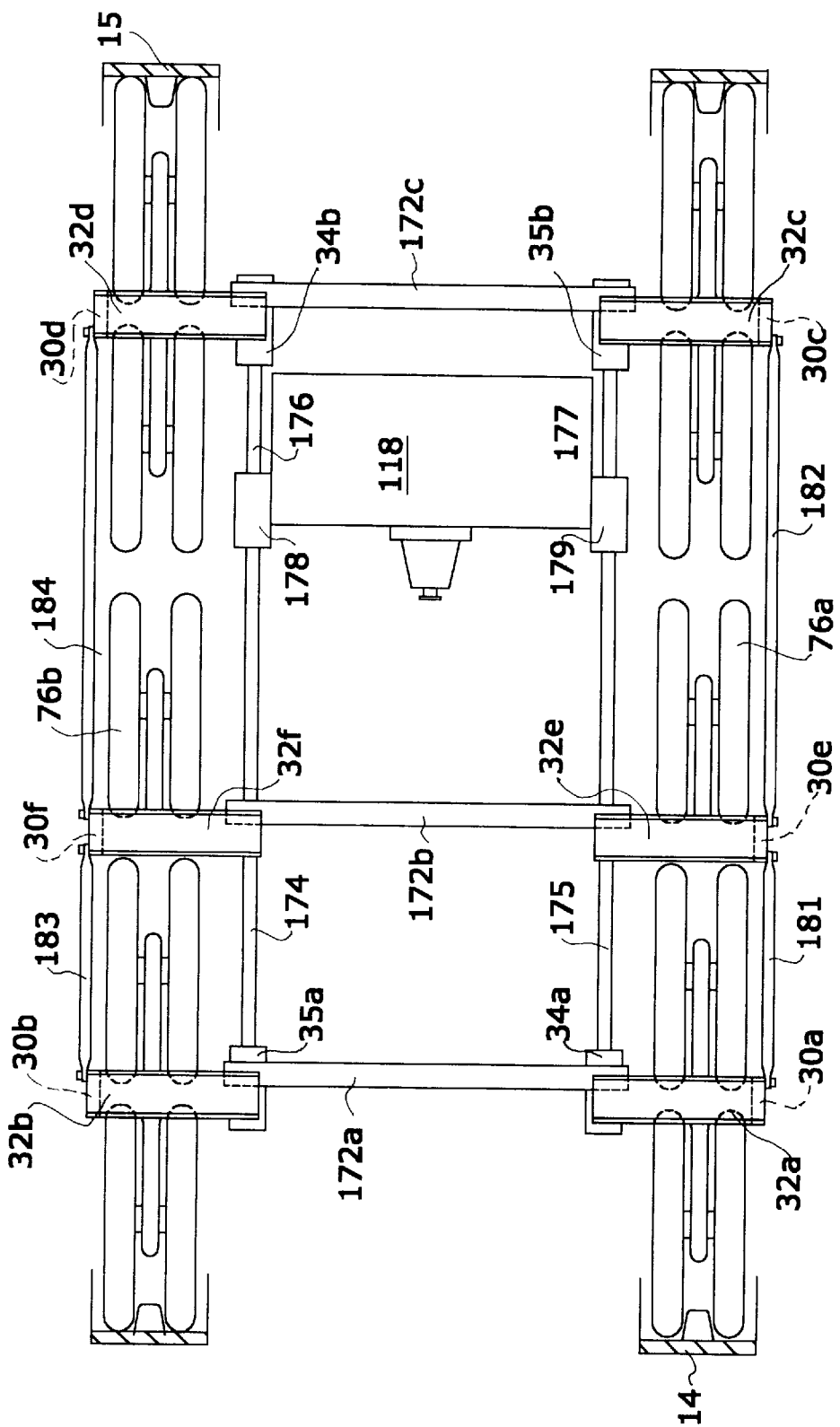

FIG. 9 is a schematic top view of the modular system (with some parts omitted to enhance clarity), showing structural members in place for maintaining alignment of the apparatus, permitting the module to be pre-assembled and moved around as a self-contained unit prior to its attachment to a vehicle.

DETAILED DESCRIPTION (A) Track Arrangement

Figure 1:
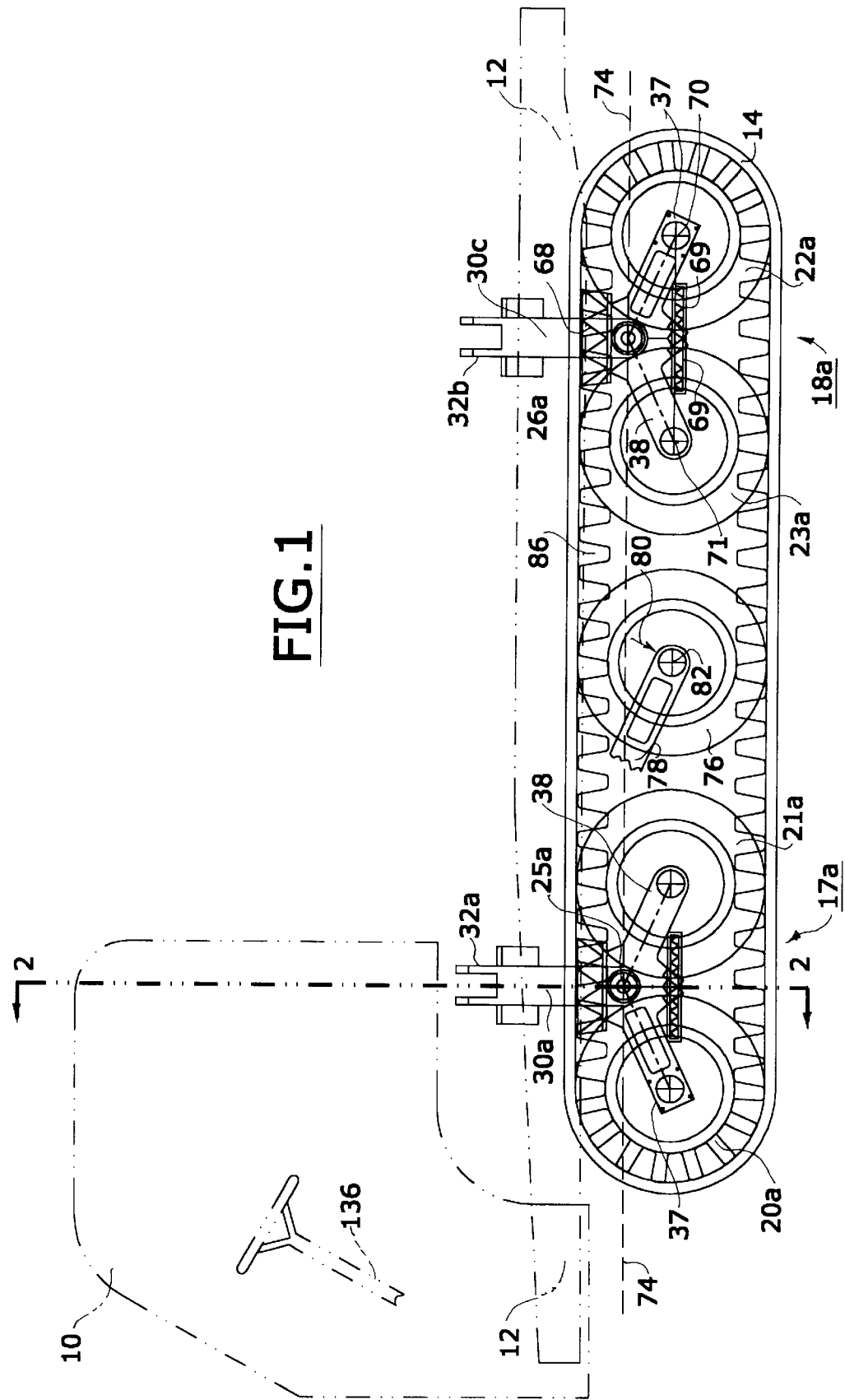
Figure 2:
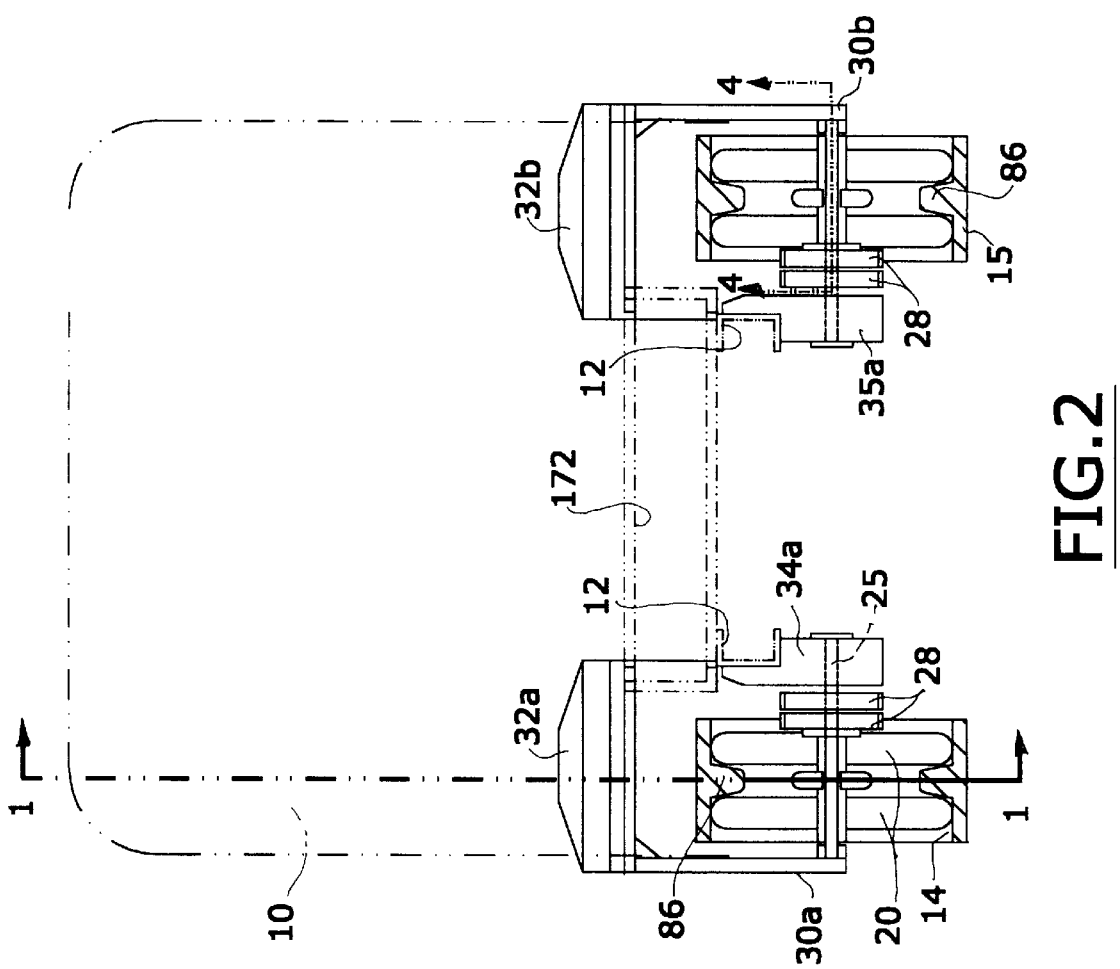
Figure 3:
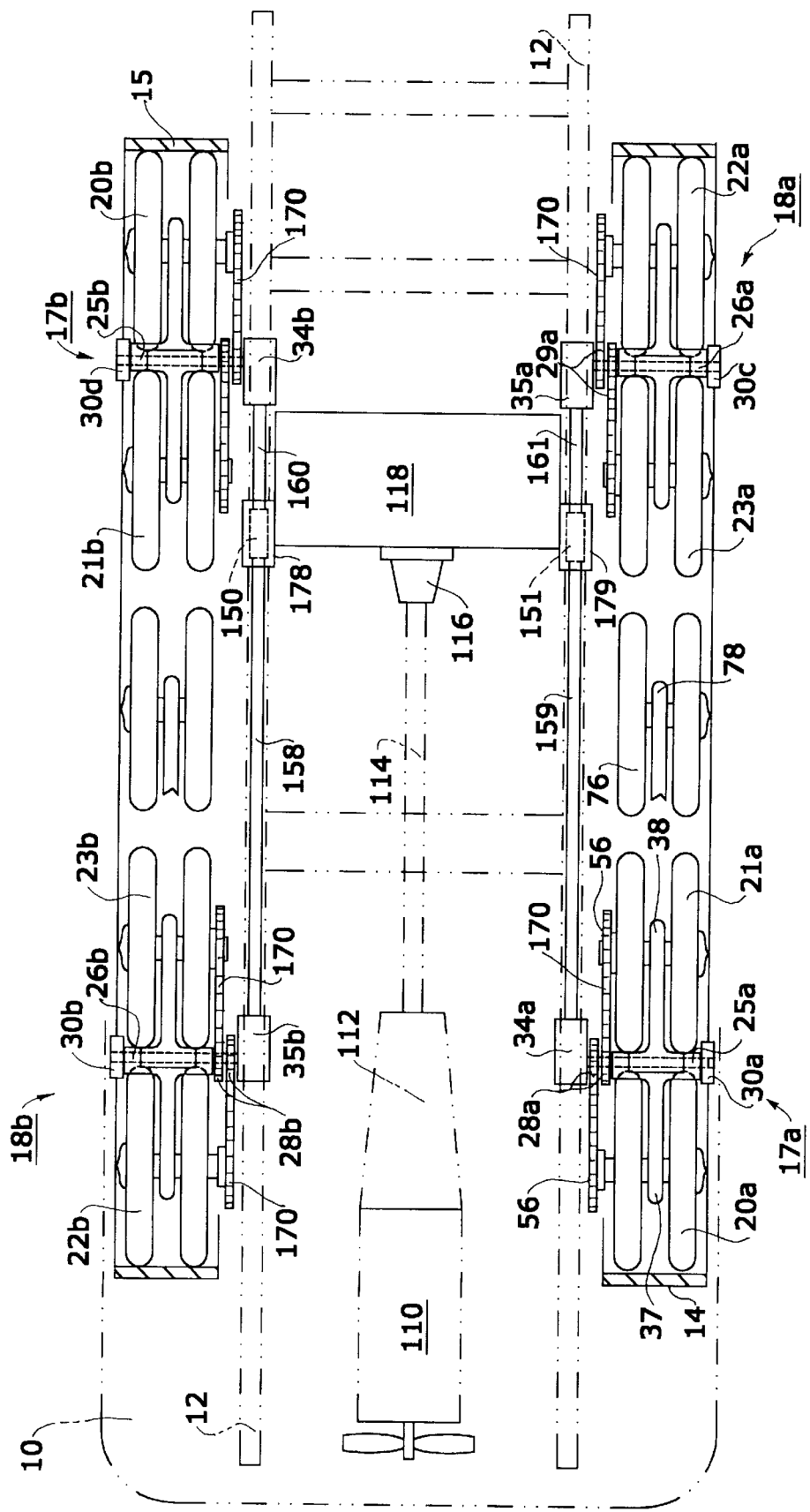

Referring first to FIGS. 1, 2, and 3, a modular track-laying suspension system according to the invention is schematically shown mounted as the undercarriage of a conventional vehicle (e.g., a truck without a truck body). Throughout the drawings, the vehicle's passenger cabin 10 and load-bearing frame 12 are shown in phantom lines to distinguish the pre-existing vehicle to which the modular invention has been affixed.

The modular suspension system preferably includes a pair of endless rubber tracks suspended beneath load-bearing frame 12 on opposite sides of the vehicle, namely, left-side track 14 and right-side track 15. Each track 14, 15 is preferably driven by a respective pair of drive units 17a, 18a and 17b, 18b that are in frictional driving contact with the front and rear ends of each endless track 14, 15. [NOTE: While the reference numerals in the drawings include the additional suffixes "a" and "b" to distinguish duplicated parts of these drive units, the following description will identify these identical parts using only the basic reference numeral.] Each drive unit 17, 18 has a respective pair of dual-wheels 20, 21 and 22, 23 arranged in tandem.

A respective drive-unit axle 25, 26 is associated with each drive unit 17, 18 and is positioned intermediate between wheels 20, 21 and 22, 23, respectively. Also, respective dual sprockets 28, 29 are associated with each drive unit 17, 18, being fixed by splines to rotate with each drive-unit axle 25, 26. (Drive sprockets 28, 29, along with other elements of the module's system for distributing drive and steering torques to tracks 14, 15, are described in greater detail below.)

The outer end of each drive-unit axle 25, 26 is journaled in an extension 30 of a cantilever-type strut 32 which is attached to vehicle frame 12, while the inner end of each axle 25, 26 is journaled in a respective right-angle box 34, 35 that also serves as a structural element of the invention's torque delivery system, as will be described in greater detail below.

Figure 4:
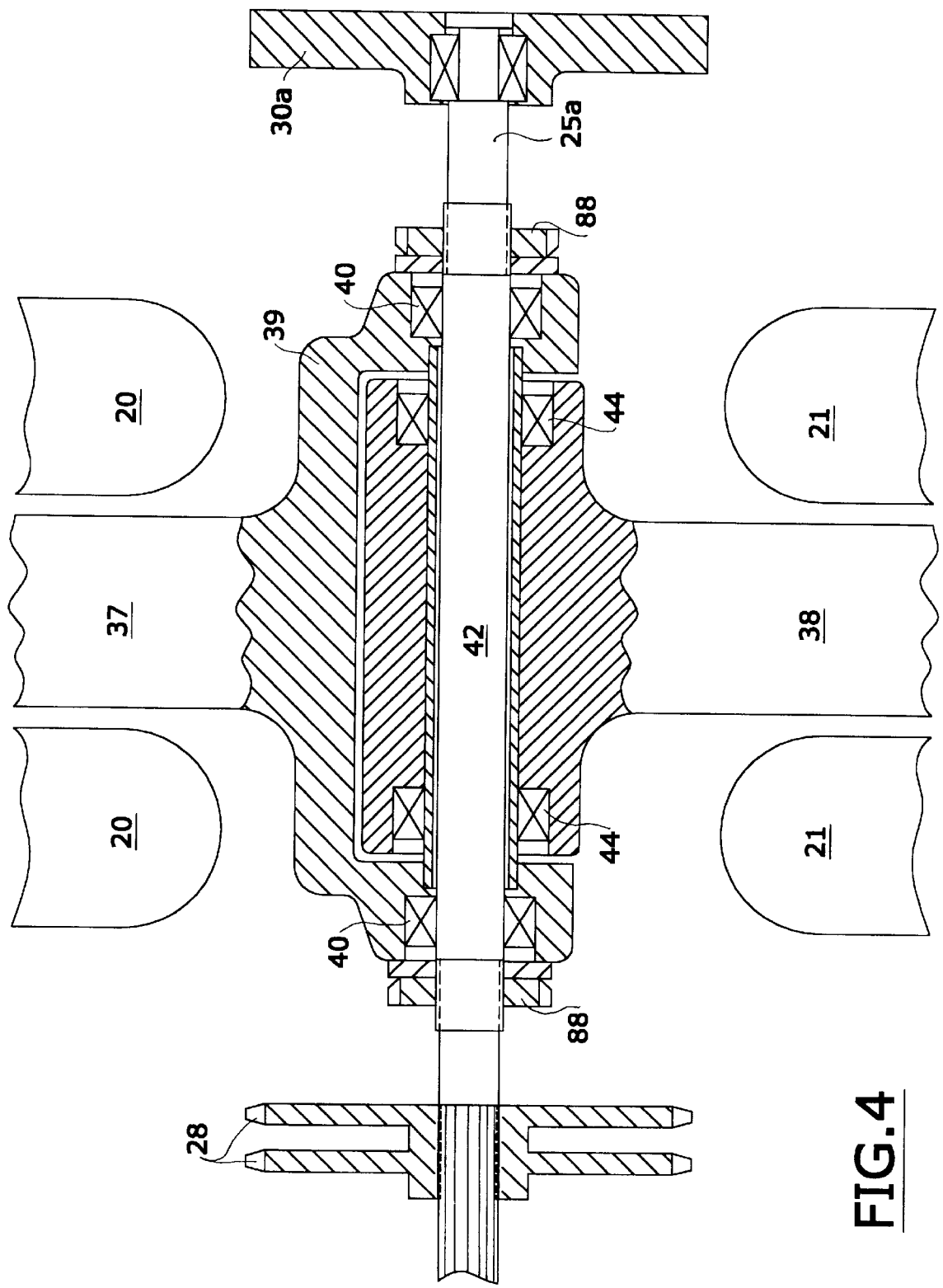
FIG. 4 is a schematic partially cross-sectional bottom view (with some parts and cross-hatching omitted to enhance clarity) of selected portions of a drive-unit axle and the support arms for a tandem pair of dual-wheels, the view taken generally along the plane 4-4 in FIG. 2.

Drive units 17, 18 are essentially identical and only drive unit 17 will be further described in detail. As can be seen best in FIGS. 1, 3, and 4 (the latter being an enlarged schematic bottom view), dual-wheels 20, 21 are supported by the outer ends of respective rocker arms 37, 38. A yoke 39 at the inner end of rocker arm 37 is rotatable about drive-unit axle 25 on bearings 40, while rocker arm 38 is rotatable about a sleeve 42 on bearings 44. Sleeve 42, which is press fit into yoke 39, moves only with rocker arm 37.

Figure 5:
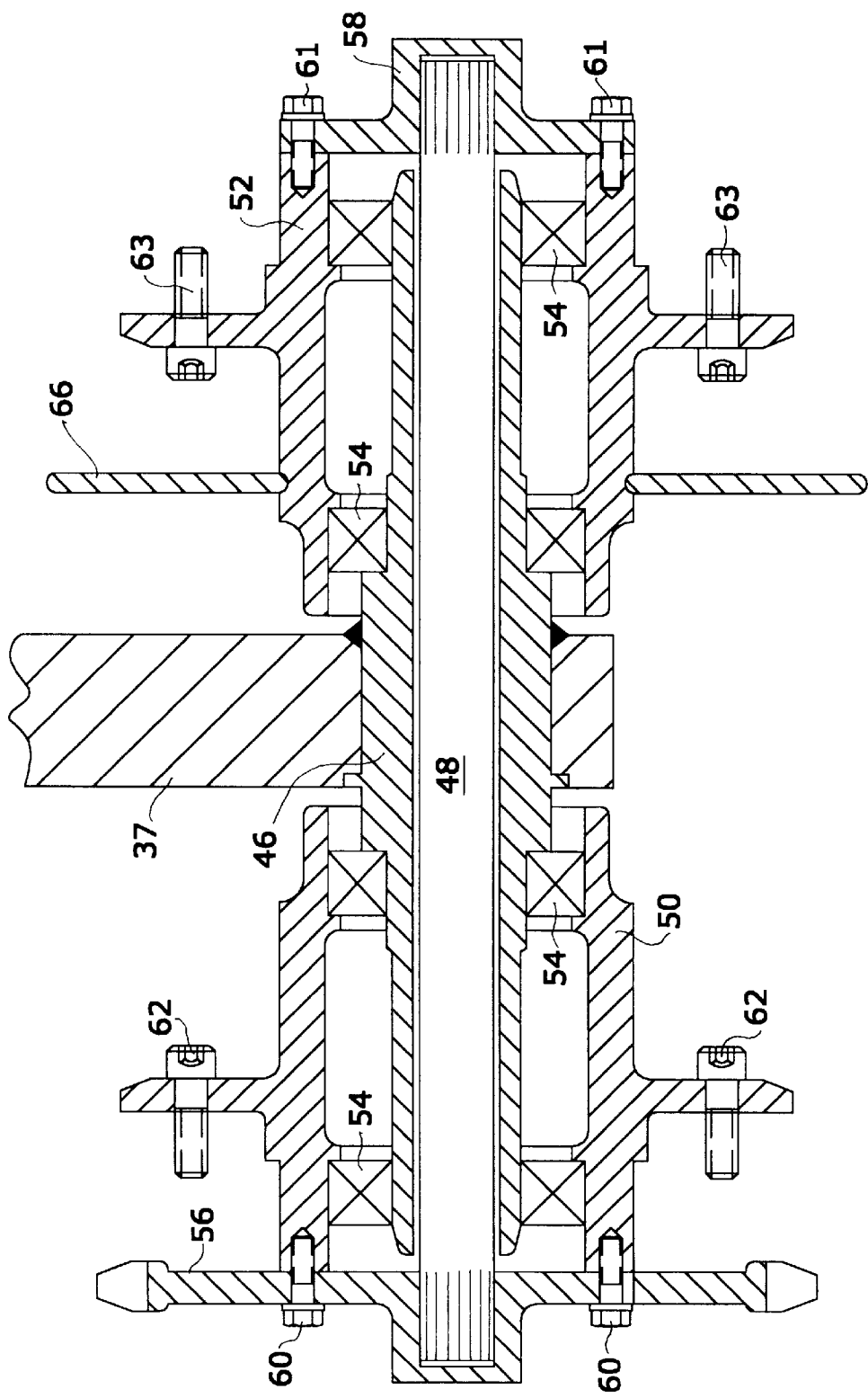
FIG. 5 is a schematic partially cross-sectional top view (with some parts and cross-hatching omitted to enhance clarity) of selected portions of the driven dual-wheel hubs used to receive and support the wheels and tires of the dual-wheels of each tandem pair.

An enlarged top view of the mounting arrangement for each dual-wheel is shown in FIG. 5. Press fit and welded to the outer end of rocker arm 37 is a hollow shaft 46 on which inner hub 50 and outer hub 52 are rotatably mounted on bearings 54. Within hollow shaft 46, a hub shaft 48 freely rotates, and fixed by splines to the inner end of hub shaft 48 is a sprocket 56, while an end cap 58 is fixed by splines to the outer end of hub shaft 48. Bolts 60 fix inner hub 50 to sprocket 56 and hub shaft 48, and bolts 61 fix outer hub 52 to end cap 58 and hub shaft 48. Finally, wheel bolts 62 and 63 are used to secure the respective rubber-tired wheels of dual-wheel 20 to inner and outer hubs 50, 52. In this manner, both tires of dual-wheel 20 (shown in FIG. 4) turn together at all times and are driven by rotation of sprocket 56 as will be discussed in greater detail below.

A brake disk 66, fixed to outer hub 52, cooperates with the brake pads of a conventional automotive hydraulic brake system (not shown). The just-described dual-wheel hub mountings are virtually identical for dual-wheels 20, 21, 22, and 23. However, the position of sprocket 56 obviously differs according to its necessary respective alignment with the chains of dual sprocket 28. Also, in preferred embodiments, brake disk 66 is only fixed to the outer hubs of dual-wheels 20 and 22 to take advantage of the superior braking traction provided by the rubber tires of these respective dual-wheels. That is, because dual-wheels 20 and 22 are positioned, respectively, at the front and rear ends of each track 14, 15, the coefficient of friction between the rubber tracks and the rubber wheels is applied to a larger area of the tracks which, in these two track end locations, wrap around approximately 180° of the circumference of their respective rubber-tired wheels. For the same reason, dual-wheels 20 and 22 are also more effective than the other wheels for driving the tracks, as will be discussed further below.

Since articulation of the tandem dual-wheels of each drive unit 17, 18 is identical, the following description will make reference to only drive unit 18*a* as illustrated in FIG. 1: Sets of springs 68 and 69 act, respectively, against mating sets of upper and lower flanges (not shown in detail) formed above and below the inner ends of rocker arms 37 and 38, biasing the rocker arms and their respective dual-wheels downwardly in the direction of the terrain. In the position illustrated, each rocker arm is shown extended downward to its lower limit, i.e., against conventional stops (not shown).

As indicated above, each rocker arm 37, 38 is independently rotatable about the axis of drive-unit axle 26*a* in a vertical plane perpendicular to that axis. When traversing the uneven surface of unpaved terrain, each dual-wheel 22*a*, 23*a* can move upward against the just-described downward spring bias to a maximum upward position wherein the centerline 70, 71 of its respective hub shaft is aligned with the plane 74 of the center lines of drive-unit axles 25*a*, 26*a*.

For use with larger vehicles requiring longer tracks, the center portion of each endless track 14, 15 is also in frictional contact with the tires of an undriven "idler" dual-wheel 76 that is positioned between the tandem dual-wheels of drive units 17 and 18. Dual-wheel 76 is supported on a conventional mounting in the form of a rocker arm 78 that is also biased by a spring force 80 in the direction of the terrain. Spring force 80 is intentionally designed to bias dual-wheel 76 with greater force than the spring forces biasing the dual-wheels of drive units 17 and 18. This increased spring pressure causes the center of each track to carry more of the load when the vehicle is standing or traveling over flat, even surfaces (e.g., pavement), thereby facilitating the turning of the vehicle under these conditions.

In a manner similar to the articulation of the dual-wheels of drive units 17 and 18, idler dual-wheel 76 also conventionally stopped in the relative position shown in FIG. 1; and it also is free to move independently upward in a vertical plane against the just-described downward spring bias to a maximum upward position wherein its hub-shaft centerline 82 is aligned with the plane 74 of the center lines of drive-unit axles 25, 26.

As can be seen in FIGS. 1 and 2, each endless track 14, 15 includes a line of interior lugs 86 spaced in alignment with the central axis of the track. Lugs 86 are designed to be received between the sidewalls of the tires mounted on the tandem dual-wheels of drive units 17, 18 and on idler dual-wheel 76. The tires are deflated prior to track installation and then inflated appropriately to provide a firm frictional connection between the rubber surfaces of the tires and the interior of the tracks. Lugs 86 maintain tracks 14, 15 in proper covering relationship over the tires. An adjusting mechanism, in the form of a pair of spanner nuts 88 (see FIG. 4), is used to maintain proper alignment between the sets of dual-wheels by adjusting the axial position of rocker arms 37, 38 relative to drive-unit axle 25*a*.

(B) Track Drive and Steering

In describing the means for supplying driving and steering torques to tracks 14 and 15, reference will be made initially to FIGS. 1, 3, 6, and 7. Whether our track-laying module is attached to an existing vehicle during its initial assembly or some time thereafter, the vehicle already has an engine 110 and a transmission 112 for transmitting driving torque to a central drive shaft 114 (see FIG. 3).

A coupling unit 116 is mounted on the front of a central housing 118 (shown enlarged in FIGS. 6 and 7), the latter being one of the structural members supporting the steer drive components being described. Coupling unit 116 is used to attach drive shaft 114 to a pair of bevel gears 120, 121, delivering driving torque to a central differential 124 which is a conventional unlimited slip differential. Central differential 124 drives right-side shaft 126 and left-side shaft 127, splitting the driving torque from drive shaft 114 in the same manner as it is divided by a standard differential between the driven axles of a wheeled vehicle.

A steering differential 130 receives steering torques delivered to worm wheel 132 from a steering worn gear 134. Preferably, steering gear worm 134 is turned by either a DC motor or a hydraulic motor 138 responsive to indications of the desired direction of vehicle operation generated by the vehicle's steering wheel 136 (FIG. 1). Of course, it may be possible that steering worm gear 134 can be turned directly by the vehicle's power-steering system In any event, steering differential 130 is also a conventional unlimited slip differential and is connected between a pair of steering control shafts 140 and 141. One control shaft 140 is connected through shaft gears 143 and 144 to right-side shaft 126; and the other control shaft 141 is interconnected in a driving relationship with left-side shaft 127, the latter interconnection being made through the meshing combination of shaft gears 146 and 147 with an idler gear 148. The just-described gearing connections cause right-side shaft 126 and control shaft 140 to rotate in opposite directions, while left-side shaft 127 and control shaft 141 rotate in the same direction. (See arrows on shafts in FIG. 6.)

As described in our earlier U.S. Pat. No. 4,776,235 (which is incorporated herein by reference), when steering torque is applied through steering worm gear 134, it causes both control shafts 140, 141 to be rotated in the same direction; and this steering torque is then simultaneously added to and subtracted from the driving torques being delivered by side shafts 126 and 127. That is, assume that the vehicle operator turns steering wheel 136 to the right, causing motor 138 to turn worm gear 134, and that this results in the rotation of worm wheel 132 and the case of steering differential 130 in a counter-clockwise direction (when viewed from the right). This, in turn, causes the two steering control shafts 140 and 141 to rotate in the direction of the arrow shown in the drawing on control shaft 141, thereby adding one-half of this steering torque to left-side shaft 127, while subtracting one-half of this steering torque from right-side shaft 126. Assuming the vehicle is traveling forward, then both side shafts 126, 127 will continue to rotate in the direction of their respective arrows; but the additional clockwise rotation of control shaft 141 will be added to the rotation of left-side shaft 127, while the additional clockwise rotation of control shaft 140 is converted into counter-clockwise rotation of gear 144, reducing the speed of rotation of right-side shaft 126.

Right-side shaft 126 delivers the combined driving and steering torques to a right-side differential 150, while left-side shaft 127 delivers the combined driving and steering torques to a left-side differential 151, these connections being made through respective sets of bevel gearing, namely, gears 153, 154 and 155, 156 Preferably, left-side and right-side differentials 150, 151 are limited-slip differentials of the type using only gears to create the torque bias necessary for prevention of slipping (e.g., see U.S. Pat. No. 2,859,641 to Gleasman). The use of limited-slip differentials increases the efficiency of the respective track drives by directing more torque to the respective drive unit which has the best frictional connection to the track at any given moment.

As can best be seen in FIG. 3, the torque output from right-side differential 150 is divided between a right-front shaft 158 and a right-rear shaft 160, while the output from left-side differential 151 is divided between a left-front shaft 159 and left-rear shaft 161. Shafts 158, 159, 160, 161 are the drive members of the torque delivery components that deliver the torque outputs of side differentials 150, 151 to the respective drive units 17, 18 associated with each respective track 14, 15 through respective front-end and rear-end right-angle boxes 34, 35.

All right-angle boxes 34, 35 are substantially identical, and only the box 34b that is located at the rear of track 15 is shown in enlarged and simplified schematic top and rear views in FIGS. 8A and 8B. Each right-angle box 34 is a structural element in which right-rear shaft 160 is supported in bearings 163 and culminates in a pinion 166 to deliver a portion of driving and steering torque through a meshing ring gear 168 to the inner end of drive-unit axle 25. In the preferred embodiment illustrated in FIGS. 8A and 8B, pinion 166 and ring gear 168 are designed to provide a speed reduction in the torque delivered to drive-unit axle 25. As indicated earlier, in addition to supporting a tandem set of dual-wheels 20, 21, drive-unit axle 25 also carries a set of dual sprockets 28.

Referring again to FIGS. 3, 4, and 5, pairs of chain belts 170 connect the dual sprockets 28 of each drive unit with the respective sprockets 56 associated with the hub shafts 48 of each tandem dual-wheel, completing the delivery of driving and steering torques to the tires of the dual-wheels and, thereby, to endless rubber tracks 14, 15.

In preferred embodiments, side differentials 150, 151 are of the limited-slip type to assure that any slippage of the drive at one end of the track will not result in the total loss of driving torque in the drive axle at the opposite end of the track.

(C) Structural Support for Track-Laying Module

In one preferred embodiment of the invention, the various components of the modular suspension system just described above are literally organized into a self-contained and self-standing module that can be temporarily assembled with sufficient structural support so that the module can be separately assembled, stored, and moved prior to its final attachment as the undercarriage of an existing vehicle. The various structural members of this self-standing module will now be described with reference primarily to FIG. 9.

As described earlier, the outer end of each drive unit axle 25, 26 is journaled in the extension 30 of each respective cantilever-type strut 32 that is attachable to vehicle frame 12 (also see FIG. 2). [NOTE: As indicated above, although the reference numerals in the drawings include additional letter suffixes to distinguish duplicated parts of these drive units, the following description will once again identify many of these identical parts using only the basic reference numeral.] To maintain proper alignment and to add stiffening between the apparatus suspending left-side track 14 and right-side track 15, a plurality of C-shaped structural beams 172 (shown also in dashed lines in FIGS. 2 and 8B) are connected, respectively, between each set of right-angle boxes 34 and 35. Also, in the elongated embodiments that include idler wheels 76, in addition to the first two sets of struts 32a, 32b and 32c, 32d, a further set of struts 32e and 32f are provided, and extensions 30e and 30f, respectively, support the outer ends of the axles for each idler rocker arm 78 (shown without strut 32e and extension 30e in FIG. 1).

[NOTE: The enlargement of beam 172c illustrated in FIG. 8B is shown schematically, since minor design modifications regarding the position of the bolt holes, etc. (for connecting beam 172 to the other components of the suspension module) will vary with the preexisting design of the vehicle frame under which the module is being suspended.]

As best seen in FIG. 9, prior to attachment of the module to the frame of a truck or other vehicle, beams 172a, 172b, and 172c serve as rigid connections between each of two sets of rectangular bracing that maintain the alignment of the apparatus supporting and driving tracks 14 and 15. Namely: The components used for delivering the combined driving and steering torques from side differentials 150, 151 to right-angle boxes 34, 35 include structural supports in the form of C-shaped beams 174, 175, 176, and 177 that are fixed to a right bracket 178 and a left bracket 179 that extend from central housing 118 to support and protect right-side differential 150 and left-side differential 151 (see partial enlargements in FIGS. 6 and 7). As best seen in FIG. 9, beams 174, 175, 176, and 177 are connection elements used to align the torque delivery components of the suspension system by providing respective structural interconnections between right bracket 178 and left bracket 179 and their associated right-angle boxes 34 and 35, thereby serving as the respective interior sides of the two sets of rectangular bracing.

Struts 32a and 32c form the leading and trailing sides of the bracing for left-side track 14, while struts 32b and 32d form the leading and trailing sides of the bracing for right-side track 15. For the elongated track system illustrated, struts 32e and 32f provide additional rectangular bracing. Finally, the bracing rectangles are completed by sets of guard rails 181, 182 and 183, 184 which are bolted, respectively, between strut extensions 30a, 30e, and 30c for left-side track 14 and between strut extensions 30b, 30f, and 30d for right-side track 15. These sets of guard rails are bolted to the respective strut extensions 30 in general alignment with the center lines of the respective bearings supporting the outside end of each of the drive and rocker arm axles (i.e., along the line of plane 74 in FIG. 1).

As indicated above, the just-described rectangular bracings, along with beams 172, maintain the alignment of the apparatus supporting and driving tracks 14 and 15, permitting the module to be pre-assembled and moved around as a self-contained unit prior to its attachment to a vehicle, whether such attachment occurs at the time the vehicle is originally assembled or at sometime thereafter. According to the design of the vehicle's load-bearing frame 12 (which generally varies from one type of vehicle to the next), beams 172 are either permanently attached between the left and right sides of the module, or the connection of beams 172 may be temporary, being used only during handling of the module prior to attachment to the vehicle. Whether or not beams 172 are retained for structural support, a portion of each right-angle box 34, 35 is formed to be received around and fixed to the vehicle's load-bearing frame 12 as can be seen at the upper left side of right-angle box 34b in FIG. 8A. Therefore, each right-angle box 34, 35 serves as one of the structural connecting elements used for aligning and fixing the suspension system to the vehicle.

Further in this regard, beams 174, 175, 176, and 177 are retained for structural support and are also used to partially enclose and protect front shafts 158, 159 and rear shafts 160, 161 by being positioned between those respective shafts and the terrain. Guard rails 181, 182, 183, and 184 are similarly retained for structural support of the module after its attachment to a vehicle.

Therefore, in addition to making the respective connections to drive shaft 114 and steering wheel 136 (as described above), attachment of our module to vehicle 10 is substantially completed by merely bolting the following elements to the vehicle's load-bearing frame 12: (a) cantilever struts 32; (b) right-angle boxes 34, 35; (c) right and left brackets 178, 179 of housing 118; and (d) the interior ends of the axles of rocker arms 78 of idler dual-wheels 76. Of course, hydraulic lines must be connected from the vehicle's brake system to operate the brake pads associated with brake disks 66. Such brake components and connections are well known and are not shown, since only the location of brake disks 66 (as shown in FIG. 5) is of particular significance to the invention.

(D) Possible Modifications of Preferred Embodiments

While the drawings and description have been limited to preferred embodiments of the invention, it should be understood that the claims below are not intended to be so limited. There are many modifications that can be made to the preferred embodiments, such as:

(a) For lighter loads or economy, drive units 17, 18 can be revised so that only one dual-wheel 20, 22 of each tandem pair is driven or so that only one dual-wheel 20, 22 of only the rear tandem pair associated with each track 14, 15 is driven. Where such modifications are made, it is again noted that the wheels being driven should be those at the ends of each track 14, 15 to take advantage of the greater frictional connection which occurs between the rubber tracks and the rubber wheels in these two track end locations due to the fact that the tracks are wrapped around approximately 180° of the circumference of respective rubber-tired dual-wheels 20, 22.

(b) Front and rear shafts 158, 159, 160, 161 may be replaced with chain belt drives if side differentials 150, 151 are reoriented and replaced with known differentials of the type using a hollow shaft to provide differentiated output between two shafts emerging from the same side of the differential.

(c) The gearing supported in right-angle boxes 34, 35 may deliver torque at a 1:1 speed ratio rather than at a speed reduction.

(d) The dual-wheels can be replaced with single wheels; and, if this is done, the track can be modified to include two sets of interior lugs that straddle each single tire.

(e) In the event that, for some reason, it is deemed desirable to maintain the more conventional dual-lever steering presently used on most track-laying vehicles, our modular suspension system can be used without the steering differential.

We claim:

1. A modular track-laying suspension system for attachment to a vehicle designed for moving loads over terrain, said vehicle having (a) a load-bearing frame and (b) a drive train including an engine for delivering a driving torque to a vehicle drive shaft, said suspension system comprising:

a right-side endless track and a left-side endless track;

two drive units associated with each said endless track, each said drive unit having (a) a pair of tandem wheels in contact with said endless track and (b) a respective drive-unit axle positioned intermediate said tandem wheels;

each wheel of each said tandem pair being (a) independently movable in a perpendicular vertical plane about the axis of said respective drive-unit axle and (b) resiliently biased in the direction of the terrain;

a central drive assembly, positioned for attachment to and rotation by said vehicle drive shaft, for dividing and delivering said driving torque to said respective left-side and right-side endless tracks;

at least one wheel of one of said drive units of each said endless track being driven by said respective drive-unit axle; and structural members for supporting each said endless track and said central drive assembly, said structural members being provided with connection elements for aligning said modular suspension system with and fixing said suspension system to said load-bearing frame of said vehicle to position said endless tracks in supporting relation to said vehicle.

2. The suspension system of claim 1 wherein said vehicle also has a steering wheel for indicating the desired direction of vehicle movement and said suspension system further comprises:

a steering assembly responsive to indications generated by said steering wheel for providing respective steering torques that add to and subtract from said driving torque delivered to said left-side and right-side endless tracks.

3. The suspension system of claim 2 wherein at least one wheel of each of said drive units of each said endless track is driven by said respective drive-unit axle associated with each drive unit, and further comprising:

a left-side differential and a right-side differential associated, respectively, with said left-side and right-side endless tracks for receiving said divided driving torque from said central drive assembly and for delivering said divided torque to said drive unit axles; and said respective steering torques provided by said steering assembly being added to and subtracted from said respective driving torques delivered to said left-side and right-side differentials by said central differential.

4. The suspension system of claim 3 wherein said side differentials both have limited-slip characteristics.

5. The suspension system of claim 1 wherein said two drive units are positioned, respectively, at front and rear of each said endless track, and further comprising an idler wheel frictionally associated with each said track, said idler wheel being positioned between said drive units and being also resiliently biased in the direction of the terrain.

6. The suspension system of claim 5 wherein each said idler wheel and each said tandem wheel comprises a set of side-by-side dual wheels fixed to rotate together with a predetermined axial distance between said dual wheels, and wherein each said endless track comprises interior lugs spaced in alignment with the central axis of the track and having a width selected to mate with said predetermined distance between said dual wheels for centering said track thereon.

7. The suspension system of claim 6 wherein each said drive unit further comprises (a) a pair of arms each supporting, respectively, one wheel of said pair of tandem wheels and (b) a mechanism for adjusting the position of said arms axially relative to said drive-unit axle for aligning said side-by-side dual wheels relative to said central axis of said track.

8. The suspension system of claim 1 wherein each said drive-unit axle has an outer end and an inner end, and further comprising at least two sets of two struts, the struts of each said set being positioned respectively relative to a respective one of said endless tracks, and each strut having (a) an inner portion for attachment to said load-bearing frame of said vehicle and (b) an outer extension for supporting said outer end of each said drive-unit axle; and wherein said connection elements further comprise at least one guard rail interconnecting said respective extensions of said struts associated with each said endless track, said guard rail being positioned to maintain a predetermined distance between said outer ends of said drive-unit axles.

9. The suspension system of claim 8 further comprising at least two beams, each beam being respectively associated with one of said sets of two struts to form a connection between the inner portions of said two struts.

10. The suspension system of claim 9 wherein said connection formed by each said beam is temporary.

11. The suspension system of claim 1 wherein each said endless track comprises an elastic and primarily non-metallic material.

12. The suspension system of claim 11 wherein each said tandem wheel is covered by a tire comprising an elastic and primarily non-metallic material and the only connection between said wheels and said endless tracks is by frictional contact.

13. The suspension system of claim 1 wherein said two drive units are positioned, respectively, at front and rear of each said endless track so that the front of each said endless track wraps around one tandem wheel of one said drive unit and the rear of that same endless track wraps around one tandem wheel of the other said drive unit; wherein each of said drive units has at least one tandem wheel driven by said respective drive-unit axle, and wherein said driven tandem wheels of said two tandem units are positioned, respectively, in frictional driving contact with said front and rear of each endless track.

* * * * *